（12）United States Patent
Amano et al.

(10) Patent No.: US 7,950,133 B2
(45) Date of Patent: *May 31, 2011

(54) METHOD OF RESIN SEALING PERMANENT MAGNETS IN LAMINATED ROTOR CORE

(75) Inventors: Katsumi Amano, Kitakyushu (JP); Kazutoshi Ueda, Kitakyushu (JP)

(73) Assignee: Mitsui High-Tec, Inc., Kitakyushu-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/635,094

(22) Filed: Dec. 10, 2009

(65) Prior Publication Data

US 2010/0083486 A1    Apr. 8, 2010

Related U.S. Application Data

(63) Continuation of application No. 11/596,212, filed as application No. PCT/JP2006/311162 on May 29, 2006, now Pat. No. 7,653,984.

(30) Foreign Application Priority Data

Jan. 11, 2006  (JP) .................................. 2006-003867

(51) Int. Cl.
H02K 15/02 (2006.01)
H02K 15/10 (2006.01)
(52) U.S. Cl. ................ 29/598; 29/596; 29/607; 29/609; 264/328.4; 264/272.11; 264/265; 425/544
(58) Field of Classification Search .................... 29/598, 29/596, 607, 609; 264/328.4, 328.19, 272.11–272.2, 264/265; 425/544
See application file for complete search history.

(56) References Cited

U.S. PATENT DOCUMENTS

| 4,151,636 A | * | 5/1979 | Lauer et al. ..................... 29/596 |
| 4,386,898 A | | 6/1983 | Sera |
| 4,845,837 A | | 7/1989 | Lloyd |
| 4,910,861 A | | 3/1990 | Dohogne |

(Continued)

FOREIGN PATENT DOCUMENTS

EP    1536543 A1    6/2005

(Continued)

OTHER PUBLICATIONS

Japanese Office Action dated Feb. 5, 2008, issued in corresponding Japanese Patent Application No. 2006-210110.

(Continued)

*Primary Examiner* — Derris H Banks
*Assistant Examiner* — Jeffrey Carley
(74) *Attorney, Agent, or Firm* — Westerman, Hattori, Daniels & Adrian, LLP

(57) ABSTRACT

A method comprising: a first process of placing a laminated rotor core in a preheating device to preheat the laminated core; a second process of removing the preheated laminated core from the preheating device and disposing the laminated core between upper and lower dies of a resin sealing apparatus; a third process of pressing the laminated core by the upper and lower dies and liquefying resin material in resin reservoir pots by heating; and a fourth process of ejecting the liquefied resin material from the pots into the magnet insertion holes by plungers inserted and moving vertically in the pots and thermally curing the resin material. The method improves efficiency of resin sealing the permanent magnets in the laminated core.

6 Claims, 7 Drawing Sheets

U.S. PATENT DOCUMENTS

| | | | |
|---|---|---|---|
| 4,963,307 | A | 10/1990 | Sakai et al. |
| 5,059,379 | A | 10/1991 | Tsutsumi et al. |
| 5,108,278 | A | 4/1992 | Tsutsumi et al. |
| 5,252,051 | A | 10/1993 | Miyamoto et al. |
| 5,435,953 | A | 7/1995 | Osada et al. |
| 5,527,173 | A | 6/1996 | Miller et al. |
| 5,846,477 | A | 12/1998 | Hotta et al. |
| 6,457,963 | B1 | 10/2002 | Tawara et al. |
| 7,653,984 | B2 * | 2/2010 | Amano et al. .......... 29/607 |
| 2003/0030186 | A1 * | 2/2003 | Riiska et al. .......... 264/328.4 |
| 2005/0225190 | A1 | 10/2005 | Kinashi et al. |
| 2006/0103253 | A1 | 5/2006 | Shiga et al. |
| 2008/0277825 | A1 | 11/2008 | Venrooij |

FOREIGN PATENT DOCUMENTS

| | | | |
|---|---|---|---|
| JP | 3-50941 U | 5/1991 | |
| JP | 2526143 Y2 | 2/1997 | |
| JP | 2527656 Y2 | 3/1997 | |
| JP | 11-106982 A | 4/1999 | |
| JP | 11-136911 A | 5/1999 | |
| JP | 2000-041364 A | 2/2000 | |
| JP | 2002-034187 A | 1/2002 | |
| JP | 2003-304671 A | 10/2003 | |
| JP | 3786946 B1 | 6/2006 | |
| JP | 2006-197693 A | 7/2006 | |
| WO | 2005120799 A1 | 12/2005 | |

OTHER PUBLICATIONS

International Search Report of PCT/JP2006/311162, mailing date of Sep. 19, 2006.

Office Action dated Oct. 21, 2009, issued in corresponding U.S. Appl. No. 10/584,922.

US Office Action, issued May 27, 2010 for related U.S. Appl. No. 10/584,922.

Japanese Office Action dated Feb. 22, 2011, issued in corresponding Japanese Patent U.S. Appl. No. 2010-290481.

* cited by examiner

METHOD OF RESIN SEALING PERMANENT MAGNETS IN LAMINATED ROTOR CORE

CROSS REFERENCE RELATED APPLICATIONS

This is a continuation application of U.S. patent application Ser. No. 11/596,212, filed on Nov. 14, 2006, currently pending, which is a 371 of International Application No. PCT/JP2006/311162 filed on May 29, 2006, which claims the benefit of priority from the prior Japanese Patent Application No. 2006-003867, filed Jan. 11, 2006, the entire contents of which are incorporated herein by references.

TECHNICAL FIELD

The present invention relates to a method of resin sealing permanent magnets in a laminated rotor core by fixing the permanent magnets with resin material.

BACKGROUND ART

Conventionally, as one of methods for fixing permanent magnets to a laminated rotor core used in a motor, a method of fixing permanent magnets with resin material has been proposed. Such a method is disclosed, for example, in Japanese Patent Application Laid-Open Publication No. 2002-34187, comprising the steps of: placing a laminated rotor core in a resin sealing apparatus (also referred to as resin filling apparatus) having upper and lower dies, the laminated rotor core being formed by stacking a plurality of core pieces and having a plurality of magnet insertion holes for insertion of permanent magnets around a central axial hole; supplying liquid resin material from resin reservoir pots formed in the upper die into the magnet insertion holes respectively having the permanent magnets therein; and heating the laminated rotor core to thermally cure the resin material.

The laminated rotor core is formed by a stack of core pieces blanked out from an electromagnetic steel sheet. Therefore, the temperature of the resin material is reduced when the resin material melted by heating is filled into the magnet insertion holes, which disadvantageously reduces fluidity of the resin material. Accordingly, the conventional method has difficulty in filling the resin material into the magnet insertion holes and also in curing the resin material filled in the magnet insertion holes.

To overcome the problems, the laminated rotor core is disposed in the resin sealing apparatus having the upper and lower dies and is heated to a melting temperature of the resin material by heaters incorporated in the upper and lower dies. Subsequently, the liquid resin material having a favorable fluidity is supplied into the magnet insertion holes and is cured. This countermeasure allows the permanent magnets inserted in the magnet insertion holes to be retained firmly by the resin material.

However, since the melting temperature of the resin material (e.g., an epoxy resin) is as high as around 170° C., for example, it takes several dozens of minutes for the laminated rotor core to reach the melting temperature of the resin material. Until the core reaches the melting temperature, filling of the resin material into the magnet insertion holes must be waited. Accordingly, filling operation of the resin material is greatly affected by preheating operation of the core by the heaters of the upper and lower dies, which greatly reduces operating efficiency of filling of the resin material (productivity of the resin sealing apparatus).

The present invention has been made to overcome the above disadvantages of the prior art, and it is an object of the present invention to provide a method of resin sealing permanent magnets in a laminated rotor core, wherein filling operation of the resin material is immediately conducted without being affected by the preheating operation of the laminated core, and by which the operating efficiency of filling of the resin material is improved compared with conventional methods.

DISCLOSURE OF INVENTION

To attain the above object, the present invention provides a method of resin sealing permanent magnets in a laminated rotor core, comprising: a first process of placing the laminated rotor core in a preheating device to preheat the laminated rotor core, the laminated rotor core being formed by a stack of a plurality of core pieces and having a plurality of magnet insertion holes for insertion of the permanent magnets around a central axial hole; a second process of removing the preheated laminated rotor core from the preheating device and disposing the laminated rotor core having the permanent magnets inserted therein between upper and lower dies of a resin sealing apparatus; a third process of pressing the laminated rotor core by the upper and lower dies and liquefying resin material in a plurality of resin reservoir pots by heating, the resin reservoir pots being formed in either one of the upper and lower dies so as to extend to a surface thereof that contacts the laminated rotor core; a fourth process of ejecting the liquefied resin material from each of the resin reservoir pots by a plunger to fill corresponding one or more of the magnet insertion holes with the resin material and thermally curing (solidifying) the resin material, the plunger being inserted and moving vertically in the each of the resin reservoir pots.

In the method according to the present invention, the laminated rotor core is placed and preheated in the preheating device before being disposed between the upper and lower dies of the resin sealing apparatus used for filling the resin material into the magnet insertion holes. Accordingly, filling the resin material into the magnet insertion holes can be immediately started by removing the preheated laminated rotor core from the preheating device and disposing the core between the upper and lower dies. As a result, the filling operation of the resin material is less affected by progress of preheating of the laminated rotor core and efficiency of filling operation of the resin material into the laminated rotor core is greatly improved compared with a conventional case where preheating of the laminated rotor core and filling of the resin material are performed in the same device.

Furthermore, since the laminated rotor core is preheated, liquefying of the resin material (liquefying of tablet-shaped raw material of the resin material) and filling and curing thereof are performed efficiently after the laminated rotor core is disposed between the upper and lower dies, and product quality is improved compared with conventional methods.

In the method according to the present invention, it is preferable that the resin reservoir pots in either one of the upper and lower dies of the resin sealing apparatus are formed in a region located radially inward or outward with respect to the magnet insertion holes so that the resin material is filled into the magnet insertion holes from the resin reservoir pots via resin passages formed in either one of the resin sealing apparatus and the laminated rotor core. In this instance, the liquefied resin material in each of the resin reservoir pots is supplied to corresponding one or two (three or more according to circumstances) of the magnet insertion holes via the resin passages, which allows simplification of the apparatus. In addition, the resin reservoir pots are preferably formed penetrating either one of the upper and lower dies.

In the method according to the present invention, it is preferable that the preheating of the laminated rotor core in the first process is performed with the permanent magnets inserted in the magnet insertion holes. Consequently, preheating of the laminated rotor core and of the permanent magnets can be carried out simultaneously. Depending on the type of the permanent magnets, magnetism of the permanent magnets may be decreased by heat. When such permanent magnets are used, the laminated rotor core and the permanent magnets may be heated separately. In this case, the permanent magnets are heated to an appropriate temperature (e.g., in a range of 100 to 160° C.) and then are inserted in the magnet insertion holes of the laminated rotor core heated to a higher temperature. The preheating temperature of the laminated rotor core may be equal to a melting temperature of the resin (e.g., in a range of 150 to 180° C.), or may be within a band of plus or minus 20° C. of the melting temperature. Higher preheating temperatures of the laminated rotor core would increase fluidity of the resin material in the laminated rotor core, thereby shortening the filling time and improving productivity. Lower preheating temperatures of the laminated rotor core would reduce deformation of the laminated rotor core caused by heating, but may cause incomplete filling of the resin material depending on the structure of the laminated rotor core. Therefore, it is preferable to set an appropriate preheating temperature according to the shape and height of the laminated rotor core.

In the method according to the present invention, the preheating of the laminated rotor core in the first process may be performed without the permanent magnets inserted in the magnet insertion holes, and the permanent magnets may be inserted in the magnet insertion holes after completion of the preheating of the laminated rotor core. In this instance, because the permanent magnets are not directly heated by a heat source, deterioration of the permanent magnets due to excessive heating is prevented.

In the method according to the present invention, it is preferable that the preheating of the laminated rotor core in the first process is performed by any one or more of an electric heater, induction heating and hot air.

BEST MODE FOR CARRYING OUT THE INVENTION

Figure 1:
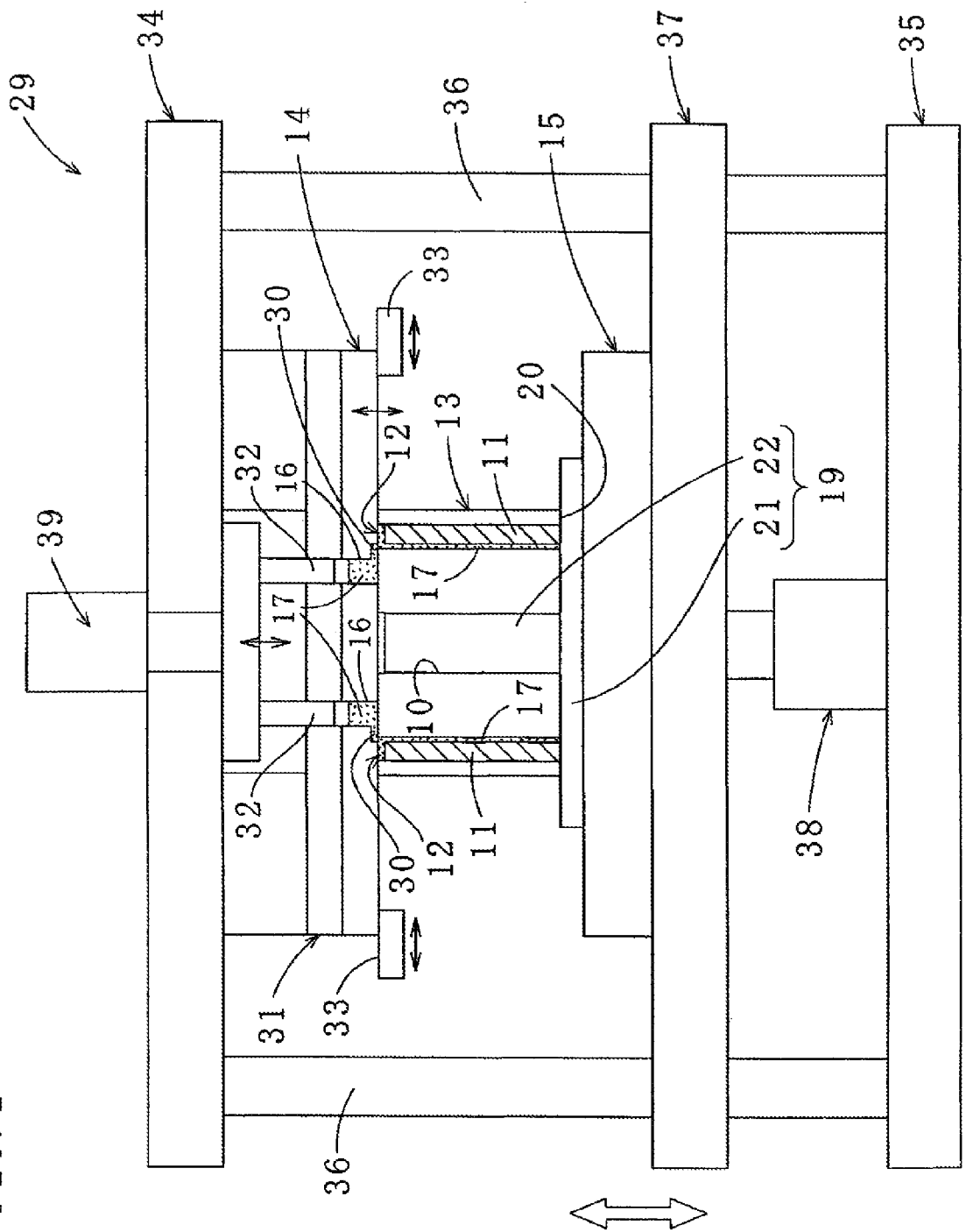
FIG. 1 is an explanatory diagram of a resin sealing apparatus used in a method of resin sealing permanent magnets in a laminated rotor core according to a first embodiment of the present invention.

Referring now to the accompanying drawings, embodiments of the present invention will be described for a more complete understanding of the invention.

As illustrated in FIGS. 1 through 4, a method of resin sealing permanent magnets in a laminated rotor core according to a first embodiment of the present invention includes a step of preheating a laminated rotor core (also referred to as a rotor) 13 in the vicinity of a prescribed temperature before resin sealing permanent magnets 11 respectively in a plurality of magnet insertion holes 12 formed on a circumferential part of the laminated rotor core 13, thereby improving efficiency of a subsequent resin sealing operation. The resin sealing of the permanent magnets 11 is effected as follows. The laminated rotor core 13 having the permanent magnets 11 in the respective magnet insertion holes 12 is clamped with the upper and lower dies 14 and 15 of a resin sealing apparatus 29, and resin material 17 is filled into the magnet insertion holes 12 from resin reservoir pots (hereafter also simply referred to as pots) 16 to fix the permanent magnets 11. The pots 16 are provided to the upper die 14 so as to correspond to the respective magnet insertion holes 12. Hereafter, the method of resin sealing permanent magnets to a laminated rotor core will be fully described in detail.

First, a preparatory process is conducted for preparing the laminated rotor cores (hereafter also simply referred to as laminated cores) 13 to be put in preheating devices 18.

Each of the laminated cores 13 is formed by sequentially stacking a plurality of core pieces prepared by blanking an electromagnetic steel sheet into an annular shape. The electromagnetic steel sheet has a thickness of, e.g., 0.2 mm or more and 0.5 mm or less. The stacked core pieces are fixed, for example, by one or both of caulking joint and welding joint.

The laminated core 13 thus formed is placed on a carrier tray 19 removed of dust, etc. beforehand. The permanent magnets 11 having a length slightly shorter than a depth of the magnet insertion holes 12 are respectively inserted in the magnet insertion holes 12 formed around an axial hole 10 in the center of the laminated core 13. After the insertion of the permanent magnets 11, a magnet detector (not shown) confirms whether the permanent magnets 11 are placed in the magnet insertion holes 12 or not. The carrier tray 19 has a rectangular plate-shaped mounting portion 21 and a rod-shaped guide member 22. A lower surface 20 of the laminated core 13 contacts the mounting portion 21. The guide member 22 is provided upright in a central part of the mounting portion 21 and to fit in the axial hole 10 of the laminated core 13. A reference numeral 10a in FIG. 2 denotes rotation stoppers (projections) for preventing rotation of the laminated core 13.

Figure 3:
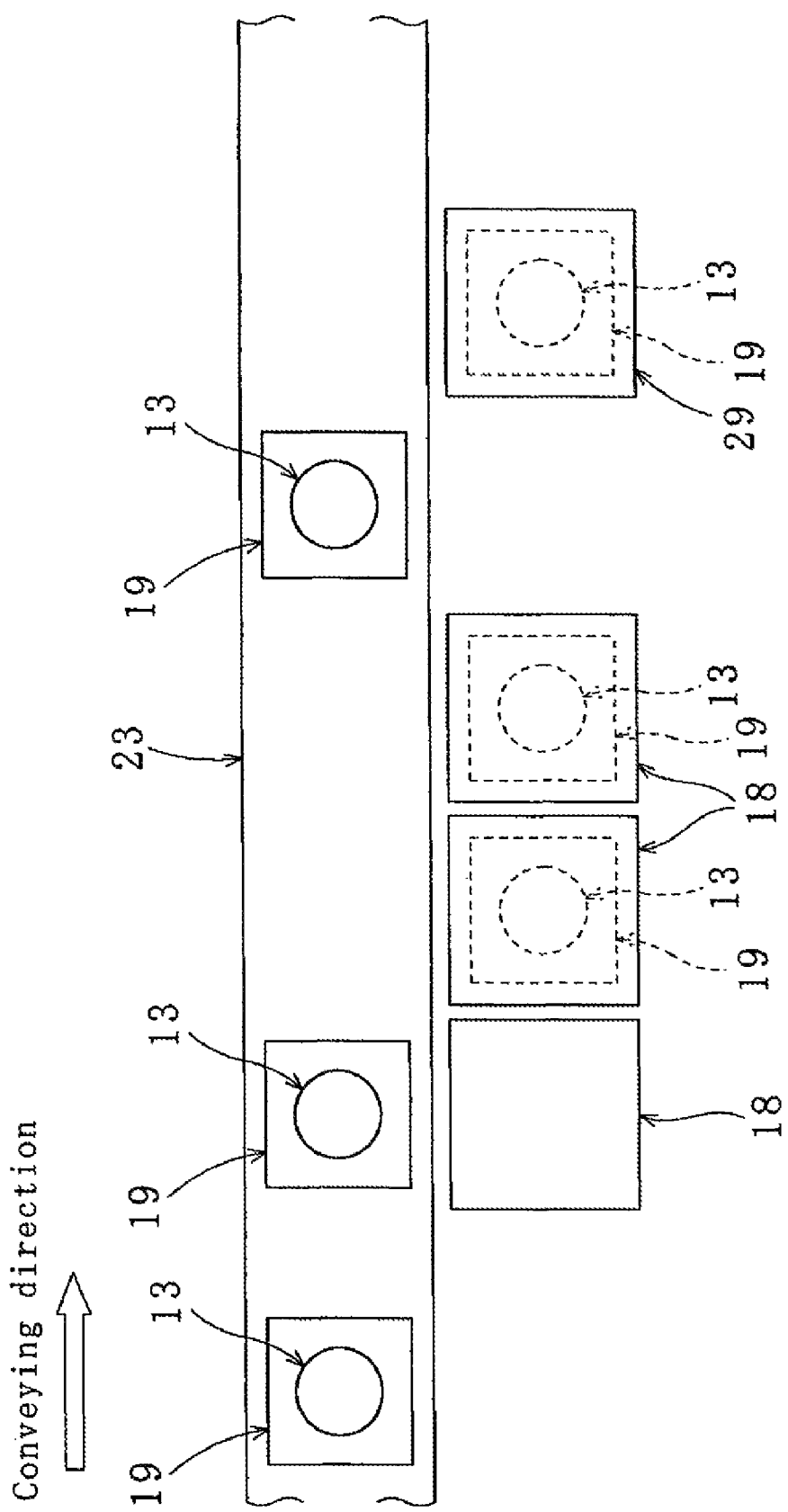
FIG. 3 is an explanatory diagram of the method.

Next, the carrier trays 19 whereon the laminated cores 13 are respectively positioned are conveyed to the preheating devices 18 by a conveyance rail 23 as shown in FIG. 3. The laminated cores 13 together with the carrier trays 19 are respectively loaded into the preheating devices 18 and are preheated to a melting temperature of the resin material 17. (First Process)

The laminated cores 13 conveyed by the conveyance rail 23 are respectively placed in the plurality of (in this embodiment, three) preheating devices 18 disposed laterally to the conveyance rail 23. After the laminated cores 13 are preheated to the melting temperature of the resin material 17 in the preheating devices 18, the preheated laminated cores 13 together with the carrier trays 19 are respectively removed from the preheating devices 18 and are conveyed to a subsequent process. The resin material may be a thermosetting resin such as an epoxy resin used conventionally in semiconductor manufacturing. The melting temperature of an epoxy resin is about 170° C. Accordingly, when an epoxy resin is used as the resin material, the preheating temperature of the laminated core 13 is set to around 170° C., or to a temperature within a band of plus or minus 20° C. of 170° C., preferably within a band of plus or minus 10° C. of 170° C. Furthermore, the number of the heating devices 18 (precisely, the number of stages for preheating the laminated rotor cores) represented by "n" is preferably an integer not exceeding a number obtained by a formula (T2/T1), where "T1" represents a total processing time of the resin sealing apparatus and "T2" represents a total processing time of the preheating device. Thereby, the preheating devices and the resin sealing apparatus can be operated efficiently.

Figure 4:
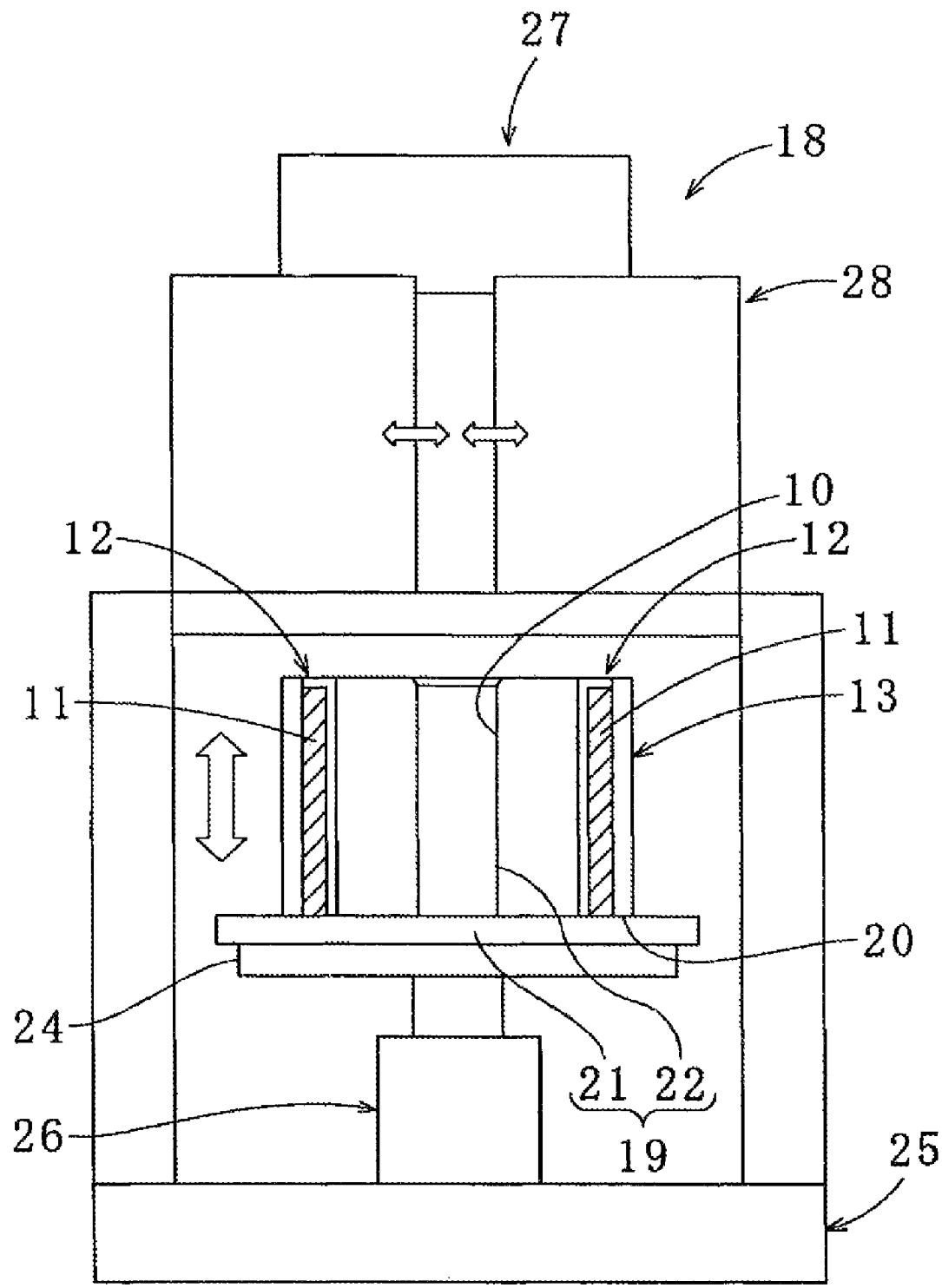
FIG. 4 is an explanatory diagram of a preheating device used in the method.

As shown in FIG. 4, each of the preheating devices 18 comprises a lower heating unit 24 for placing the carrier tray 19 thereon and an elevating means (e.g., a jack) 26 provided to a fixed mount 25 for elevating and lowering the lower heating unit 24. The preheating device 18 further comprises an upper heating unit 27 located above the laminated core 13 elevated to an upper limit position by the elevating means 26 and a lateral heating unit 28 for surrounding lateral surface of the laminated core 13. Divided vertically into two sections, the lateral heating unit 28 is openable and closeable by moving the sections in the horizontal direction, centering around the laminated core 13. Thereby, the laminated core 13 is easily set in or removed from the preheating device 18.

The heating units 24, 27 and 28 of the preheating device 18 are respectively provided with electric heaters, by which the laminated core 13 is heated. The laminated core 13 may also be heated by induction heating or hot air, or by a combination of any two or more of an electric heater, induction heating and hot air.

The preheating device in this embodiment is designed to preheat the laminated core together with the carrier tray. However, the preheating device may be configured so that only the laminated core is preheated. Although the case of employing a plurality of the preheating devices has been described, only one preheating device may be used. In this instance, the preheating device is preferably made to have a capacity to process a plurality of the laminated cores. Furthermore, a tunnel-like preheating device may be provided to the conveyance rail, whereby the laminated cores are preheated in the preheating device while the carrier trays holding the laminated cores are conveyed by the conveyance rail.

Here, the laminated core is preheated in a state where the permanent magnets are inserted in the respective magnet insertion holes beforehand. Alternatively, the laminated core may be preheated without the permanent magnets inserted in the magnet insertion holes, and the permanent magnets may be inserted in the magnet insertion holes after completion of the preheating of the laminated core.

Next, each of the preheated laminated cores 13 removed from the preheating devices 18 is conveyed with the carrier tray 19 to the resin sealing apparatus 29 via the conveyance rail 23 and is disposed in the resin sealing apparatus 29. (Second Process)

As shown in FIG. 1, the resin sealing apparatus 29 comprises, for example, the lower die 15 for holding the carrier tray 19 whereon the laminated rotor core 13 is placed and the upper die 14 mounted over the laminated core 13. The lower die 15 is capable of moving up and down and the upper die 14 is elevated with the elevation of the lower die 15. The upper die 14 has the plurality of pots 16 for raw material (also referred to as tablets) of the resin material 17 to be placed therein. The upper die 14 has the pots 16 in a region located radially inward with respect to the magnet insertion holes 12 of the laminated core 13. The upper die 14 also has resin passages (also referred to as runners) 30 at the bottom thereof for leading the melted resin material 17 in liquid form into the magnet insertion holes 12.

Figure 2:
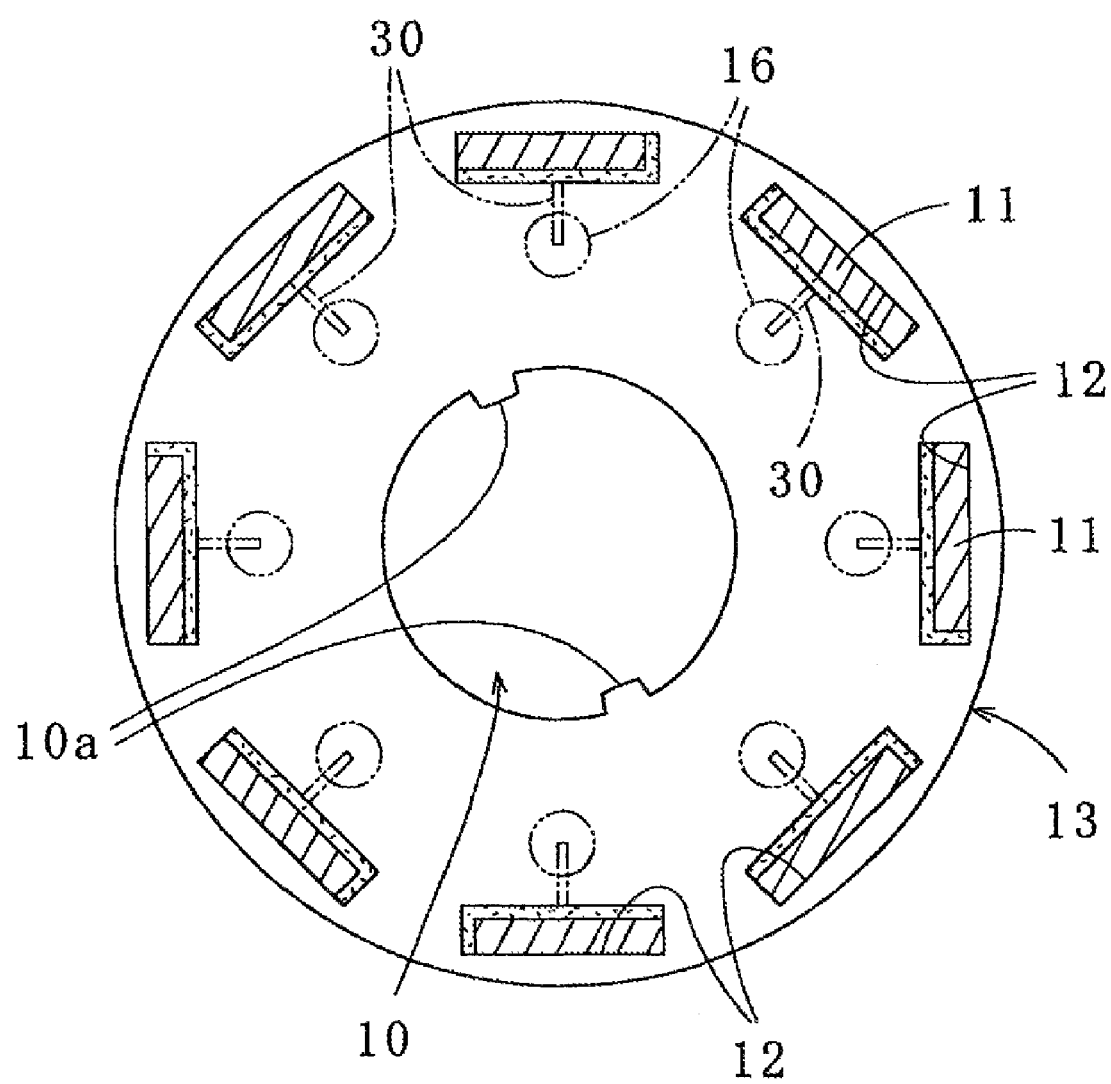
FIG. 2 is a plan view of a laminated rotor core to which the method is applied.

In FIG. 2, the pots 16 and the resin passages 30 are illustrated in imaginary line (chain double-dashed line). The pots 16 are formed penetrating vertically the upper die 14. Namely, the pots 16 are extended to the bottom of the upper die 14.

The resin sealing apparatus 29 includes a fixed mount 31, a plurality of plungers 32 for pressuring the resin material 17 in the pots 16 of the elevated upper die 14, and stoppers 33 for retaining the elevated upper die 14 in an upper limit position. The plungers 32 are provided penetrating through the fixed mount 31. The fixed mount 31 is fixedly disposed so that a gap to be a working space for insertion of the resin material 17 is formed between the upper die 14 in the lower limit position and the fixed mount 31.

The fixed mount 31 is attached to an upper fixed plate 34. The lower die 15 is placed on an elevating plate 37 that vertically moves along four guideposts 36 connecting the upper fixed plate 34 and a lower fixed plate 35. Inside the fixed mount 31, a heating means (not shown) is provided for preheating the plungers 32, thereby allowing easy ejection of the resin material 17 from the pots 16 and eliminating thermal expansion difference between the fixed mount 31 and the upper die 14 to avoid misalignment between the plungers 32 and the pots 16.

The elevating plate 37 is allowed to move up and down by a lower-die elevating means (e.g., jack) 38 provided to the lower fixed plate 35. The plungers 32 inserted respectively in the pots 16 are elevated or lowered simultaneously in the pots 16 by a plunger driving means 39 provided to the upper fixed plate 34.

The laminated rotor core 13 disposed between the upper and lower dies 14 and 15 of the resin sealing apparatus 29 having such a structure is pressed with the upper and lower dies 14 and 15, and the raw material of the resin material 17 in the pots 16 is heated by the upper die 14 so as to be liquefied. (Third Process)

Subsequently, the liquefied resin material 17 is forced out of the pots 16 into the corresponding magnet insertion holes 12 by the plungers 32 via the resin passages 30, and the resin material 17 is thermally cured. (Fourth Process) Here, the resin material 17 in liquid form ejected from the pots 16 is filled into the magnet insertion holes 12 through the resin passages 30, i.e., through between the bottom of the upper die 14 and the surface of the laminated core 13.

The temperature of the laminated core 13 at the time of filling of the resin material 17 is preferably equal to the preheating temperature of the laminated core 13 by the preheating device 18 or a temperature within a band of plus or minus 20° C. of the preheating temperature. Consequently, for example, liquefying, filling and curing of the resin material are efficiently conducted, and furthermore, deformation of the laminated rotor core is prevented.

As described above, the laminated core 13 is preheated. Therefore, the resin material can be filled and cured in the magnet insertion holes 12 in a shorter time by further heating the laminated core 13 filled with the resin material by the heating means respectively provided in the upper and lower dies 14 and 15. The resin material may be heated using any heating device other than the resin sealing apparatus 29.

The laminated core 13 having the magnet insertion holes 12 wherein the resin material 17 is filled and cured in this way is conveyed with the carrier tray 19 by the conveyance rail 23 and is cooled by a cooling device (e.g., spot cooler) to lower the temperature of the heated core 13. Subsequently, the resin material 17 overflowed from the magnet insertion holes 12 and cured on the surface of the laminated core 13 is removed. The side of the laminated core 13 removed of the overflowed resin material 17 is further polished when necessary, and then a total thickness of the manufactured laminated core 13 is measured. When the thickness of the laminated core 13 meets a target thickness, rust prevention oil is sprayed on the surface of the laminated core 13 and the laminated core 13 is shipped as a product.

As described above, since the preheating of the laminated core 13 and the filling of the resin material 17 are performed separately (with use of separate devices), the filling operation of the resin material 17 can be immediately conducted by the resin sealing apparatus 29 without being affected by preheating operation of the laminated core 13. Consequently, the working efficiency of the resin filling operation is improved compared with conventional methods.

Next, the method of resin sealing permanent magnets in a laminated rotor core according to a second embodiment of the present invention will be descried only for parts different from the method according to the first embodiment of the present invention. A resin sealing apparatus having an upper die 40 whereon no resin passage is formed may be used as shown in FIGS. 5 and 6.

Here, resin passages (also referred to as runners) 44 for leading the resin material 17 in liquid form from resin reservoir pots 42 on the upper die 40 into magnet insertion holes 43 in a laminated rotor core 41 are formed at an upper end portion of the laminated rotor core 41.

The resin passages may be formed only in a core piece on a top of the laminated rotor core 41 or in a plurality of core pieces including the top core piece of the laminated rotor core 41. The number of the core pieces formed with the resin passages may be decided according to a thickness of the core pieces. In this embodiment, the resin passages 44 are formed by two core pieces, one on the top of the laminated rotor core 41 and the other adjoining the top core piece.

Figure 5:
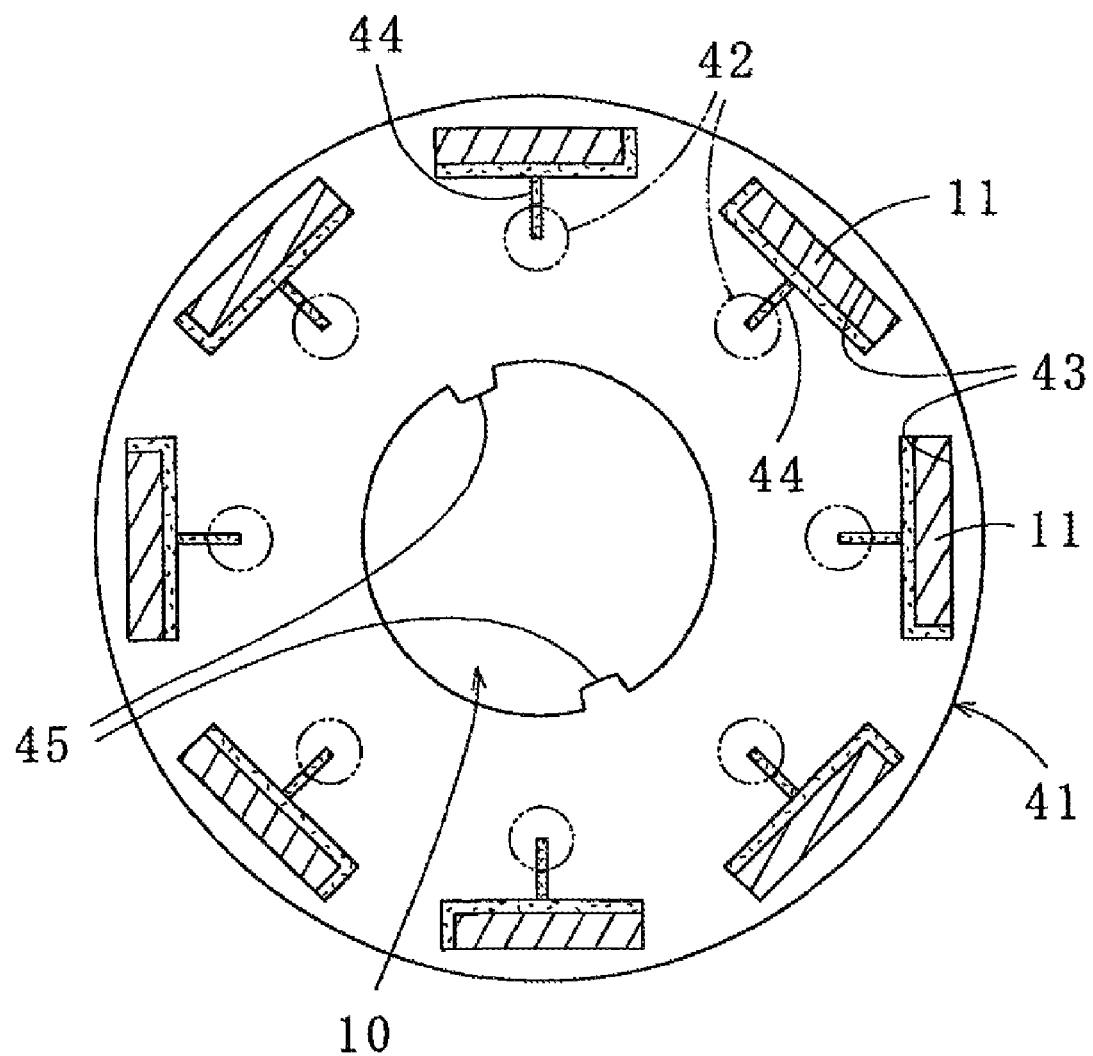
FIG. 5 is a plan view of a laminated rotor core to which the method of resin sealing permanent magnets in a laminated rotor core according to a second embodiment of the present invention is applied.
Figure 6:
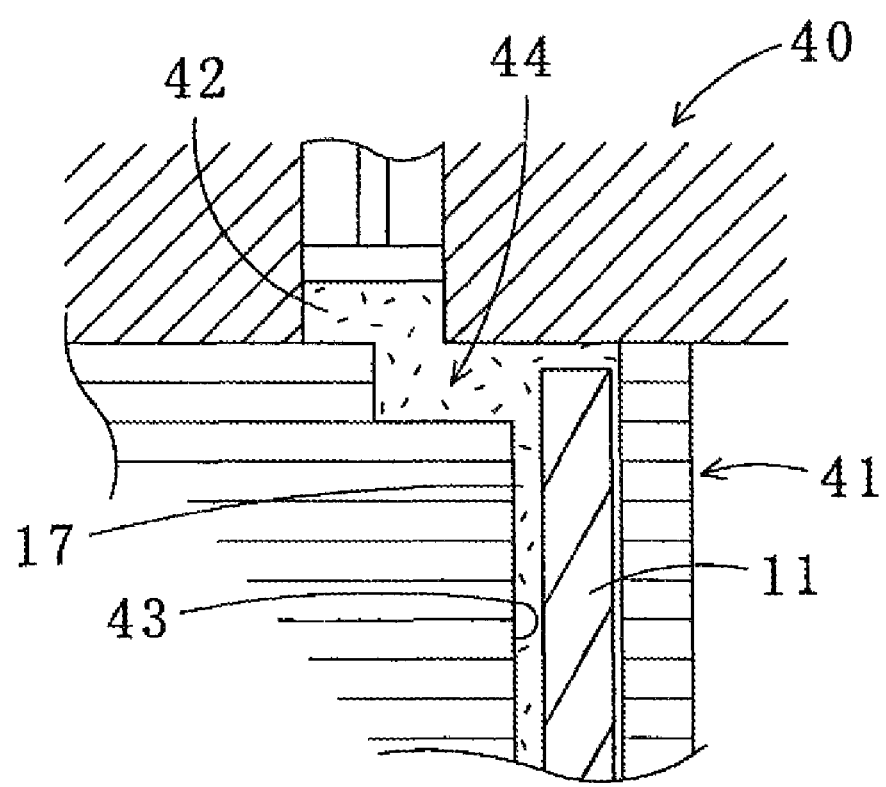
FIG. 6 is a partly sectional side view of the laminated rotor core illustrated in FIG. 5.

A reference numeral 45 in FIG. 5 denotes rotation stoppers (projections) for the laminated rotor core 41.

In the above embodiments, the heating means is provided to each of the upper and lower dies. Alternatively, the heating means may be provided only to the upper die.

Furthermore, the plurality of resin reservoir pots are formed in the region located radially inward with respect to the magnet insertion holes of the laminated core. Alternatively, the pots may be provided in a region located radially outward with respect to the magnet insertion holes. Although the case where the resin reservoir pots are provided in the upper die of the resin sealing apparatus has been described, the pots may be provided to other parts of the resin sealing apparatus, for example, to the lower die. When the pots are formed in the lower die, the heating means for liquefying the raw material of the resin material is provided at least to the lower die.

Figure 7:
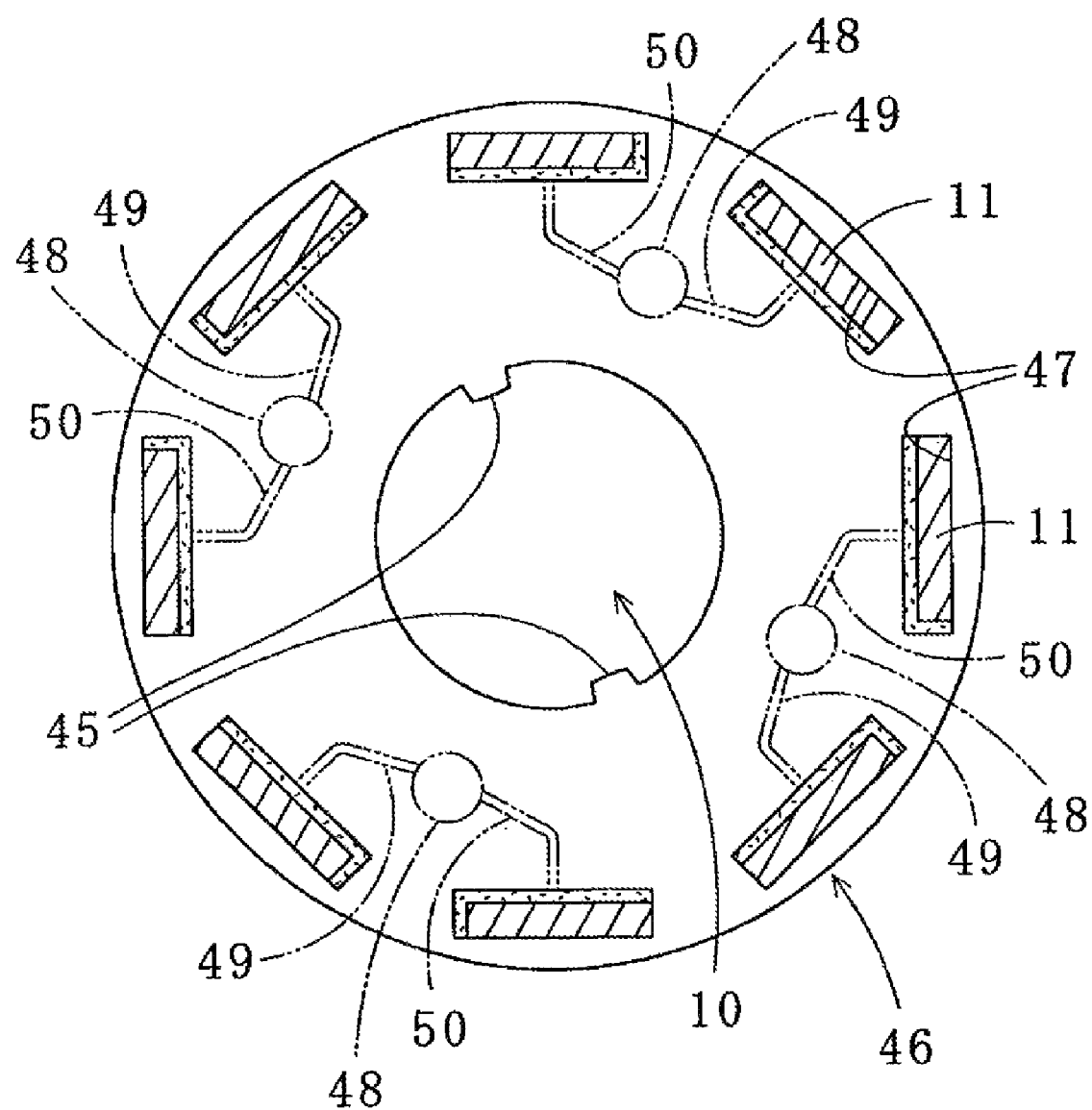
FIG. 7 is a plan view of a laminated rotor core to which the method of resin sealing permanent magnets in a laminated rotor core according to a third embodiment of the present invention is applied.

Referring now to FIG. 7, the method of resin sealing permanent magnets in a laminated rotor core according to a third embodiment of the present invention will be descried only for parts different from the method according to the first and second embodiments of the present invention.

In this embodiment, the resin material is supplied from four resin reservoir pots 48 through resin passages 49 and 50 to eight magnet insertion holes 47 respectively having the permanent magnets 11 therein. The pots 48 are formed in an upper die and the magnet insertion holes 47 are provided around the central axial hole 10 of a laminated rotor core 46. Namely, the resin material is supplied from each of the resin reservoir pots 48 to a plurality of (two or more of) the magnet insertion holes 47. The resin passages 49 and 50 in this instance may be provided in the upper die or on an upper surface of the laminated rotor core 46. Decreasing the number of the resin reservoir pots in this way allows simplification of the resin sealing apparatus.

Implementation of the present invention is not limited to the above embodiments, and various modifications may be made without departing from the scope or spirit of the present invention. Therefore, the present invention includes any method of resin sealing permanent magnets in a laminated rotor core according to the present invention embodied by the combination of a part or all of the above embodiments and modifications.

INDUSTRIAL APPLICABILITY

In the method of resin sealing permanent magnets in a laminated rotor core according to the present invention, the laminated rotor core is preheated for a sufficient time before being disposed between the upper and lower dies of the resin sealing apparatus used for filling the magnet insertion holes with the resin material. Consequently, the laminated rotor core can be processed without occurrence of thermal deformation.

Furthermore, provision of a plurality of devices for preheating the laminated rotor core to one resin sealing apparatus allows continuous operation of the resin sealing apparatus, thereby improving efficiency of the resin sealing operation of the laminated rotor core.

What is claimed is:

1. A method of resin sealing permanent magnets in a laminated rotor core, comprising:
    a first process of placing and preheating the laminated rotor core in a preheating device, the laminated rotor core being formed by a stack of a plurality of core pieces and having a plurality of magnet insertion holes for insertion of the permanent magnets around a central axial hole;
    a second process of removing the preheated laminated rotor core from the preheating device and disposing the laminated rotor core having the permanent magnets inserted therein between upper die and lower die of a resin sealing apparatus;
    a third process of pressing the laminated rotor core by the upper die and lower die and liquefying resin material in a plurality of resin reservoir pots by heating, the resin reservoir pots being formed in either one of the upper die and lower die so as to extend to a surface thereof that contacts the laminated rotor core;
    a fourth process of ejecting the liquefied resin material from each of the resin reservoir pots by a plunger to fill corresponding one or more of the magnet insertion holes with the resin material and curing the resin material, the plunger being inserted and moving vertically in the each of the resin reservoir pots; and
    a fifth process of cooling the laminated rotor core by a cooling device, the laminated rotor core filled with the cured resin material,
    wherein the resin reservoir pots penetrate the upper die or lower die in which the resin reservoir pots are formed.

2. The method of resin sealing permanent magnets in a laminated rotor core as defined in claim 1, wherein the laminated rotor core is conveyed on a carrier tray.

3. The method of resin sealing permanent magnets in a laminated rotor core as defined in claim 1, wherein the resin reservoir pots are formed in a region located radially inward or outward with respect to the magnet insertion holes so that the resin material is filled into the magnet insertion holes from the resin reservoir pots via resin passages formed in either one of the resin sealing apparatus and the laminated rotor core.

4. The method of resin sealing permanent magnets in a laminated rotor core as defined in claim 2, wherein the resin reservoir pots are formed in a region located radially inward or outward with respect to the magnet insertion holes so that the resin material is filled into the magnet insertion holes from the resin reservoir pots via resin passages formed in either one of the resin sealing apparatus and the laminated rotor core.

5. The method of resin sealing permanent magnets in a laminated rotor core as defined in claim 2, wherein the preheating of the laminated rotor core in the first process is performed with the permanent magnets inserted in the magnet insertion holes.

6. The method of resin sealing permanent magnets in a laminated rotor core as defined in claim 2, wherein the preheating of the laminated rotor core in the first process is performed without the permanent magnets inserted in the magnet insertion holes, and the permanent magnets are inserted in the magnet insertion holes after completion of the preheating of the laminated rotor core.

* * * * *